UNITED STATES PATENT OFFICE.

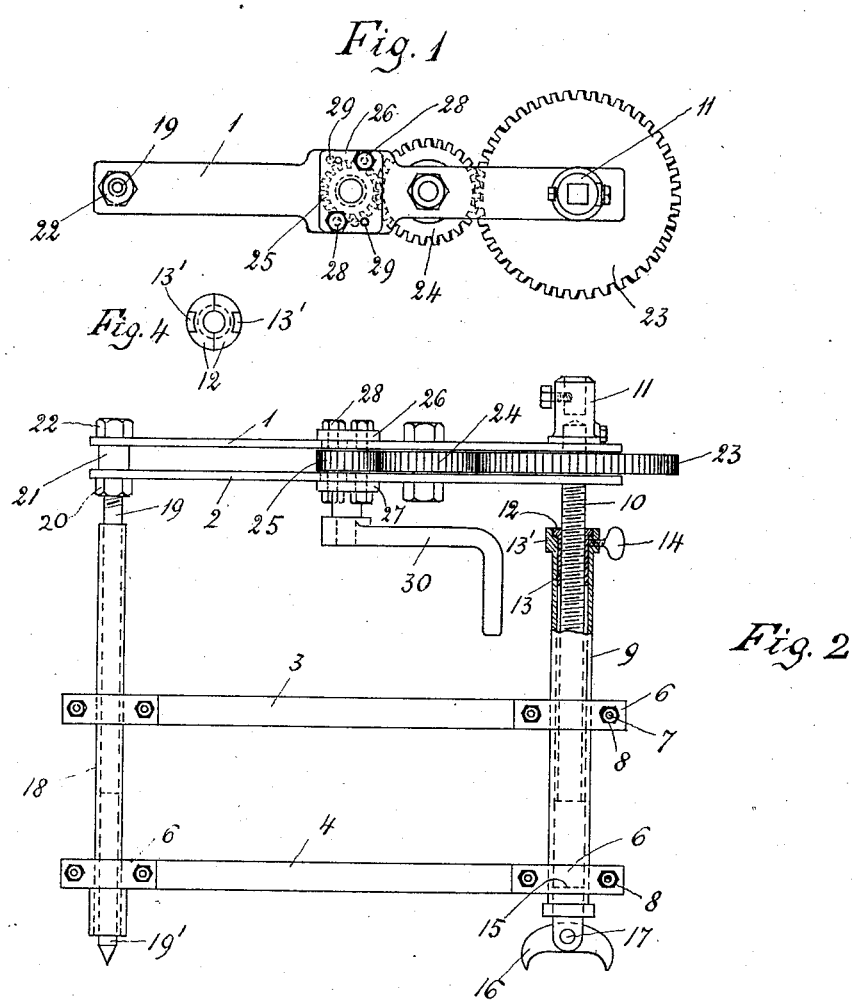

THEOPHILUS LIPPIETT, DAVID LIPPIETT, THOMAS LIPPIETT, STEPHEN LIPPIETT, BENJAMIN LIPPIETT, AND WILLIAM LIPPIETT, OF TREDEGAR, ENGLAND.

MANUAL COAL AND ROCK DRILLING MACHINE.

1,054,925.   Specification of Letters Patent.   Patented Mar. 4, 1913.

Application filed November 4, 1911. Serial No. 658,574.

*To all whom it may concern:*

Be it known that we, THEOPHILUS LIPPIETT, DAVID LIPPIETT, THOMAS LIPPIETT, STEPHEN LIPPIETT, BENJAMIN LIPPIETT, and WILLIAM LIPPIETT, subjects of the King of England, and residents of Tredegar, Monmouthshire, Wales, England, have invented a Manual Coal and Rock Drilling Machine, of which the following is a specification.

This invention concerns improvements in and relating to manual coal and rock drilling machines.

The purpose of the invention is to provide an improved continuous boring reversible drilling machine, both light and strong, which may conveniently be worked either in a sitting or kneeling posture.

The invention consists particularly in the framing and assembling together of the essential parts of such a machine as hereinafter described.

In the accompanying drawings: Figure 1 represents a plan of our manual rock drilling machine; Fig. 2 is an elevation of the same; Fig. 3 is a plan of one of the tie bars connecting the drill-stock tube and guide tube; Fig. 4 is a plan of certain details relating to the end of the tube 9 and brass nut therein.

The same reference numbers are employed to denote like parts throughout the several views.

Now we carry this invention into effect as follows.

The essential parts of our machine are carried by two pairs of bars, substantially equal in length and parallel to one another. Of these the one pair 1, 2 support the driving mechanism and are connected, at the end remote therefrom, to a tubular guide 19; and the other pair 3, 4 we employ to join rigidly parallel a tube 9, carrying the nut in which the screwed stock of the drill works, and the guide tube 18. The said bars 3, 4, are cranked as at 5, and the said tubes 9, 18, are fastened in the cranked portions by cranked straps 6 by bolts 7 and nuts 8. The ends of the bars, 1, 2 are traversed, and the tube 9 is telescoped by the screwed stock 10 of the drill which carries the drill chuck 11 on the side of the plate 1 remote from the tube 9. The near end of the tube 9, relative to the drill chuck, is recessed to receive flanged brasses 13 in the flanges 12 of which are lateral recesses which engage lugs $13^1$ at the end of the tube 9. The said brasses together form a nut, split longitudinally, in which works the screwed drill stock 10, being provided with female screw thread for the purpose of engaging the male thread on the said stock. One of the brasses is tightened on the said stock by an adjusting screw 14. The end of the tube 9 remote from the chuck carries a plug 15 formed to serve as a holdfast by the pivoting therein, as at 17, of a flat bar formed with two sharp jaws 16. The tube 18 we use to steady and support the ends of the framing bars 1, 2, between which the multiple gear wheels 23, 24, 25 are mounted, and it achieves this purpose by acting as a guide to the tubular member 19. The tube 18 is plugged with a steel center $19^1$ at its end, which, together with the holdfast 16, 17, is designed to enter into the substance of a wooden beam or the like parallel with the bars 1, 2, 3, 4.

The tubular member 19 which, telescoping the tube 18, prevents the framing bars 1, 2 from swinging about the drill stock, has its end remote from the center $19^1$ screwthreaded and carries an adjusting nut 20. The end of the said member traverses the ends of the bars 1, 2 between which it carries a tubular spacing washer 21, and is fixed thereto by a nut 22.

To the drill stock 10 is keyed or equivalently fixed a large gear wheel 23 revolving between the bars 1, 2 and geared by an intermediate idler 24, to a small driving wheel 25. The spindle of the driver 25 is carried in bearings formed by two rectangular plates 26, 27, which are affixed to the bars 1, 2 by screw bolts 28. The end of the spindle of the driver has a crank 30 for the operator's hand.

The gear wheels 23, 24, 25, may be suitably incased to prevent danger to the operator.

Having now fully described our said invention what we claim and desire to secure by Letters Patent is:—

In a manual coal and rock drill, the combination, with cranked parallel bars, of tubes, cranked straps by means of which the said tubes are attached to said parallel bars, holdfasts plugging the said tubes, an adjustable split feed nut carried by one tube, a drill stock telescoping one tube and engaging the said nut, a tubular guide telescoping the other tube, parallel bars fitted to the said guide and drill stock, gear wheels contained by the said bars, an operating crank and a drill chuck, all substantially as and for the purpose herein set forth.

In testimony whereof we have hereunto set our hands in the presence of two subscribing witnesses.

THEOPHILUS LIPPIETT.
DAVID LIPPIETT.
THOMAS LIPPIETT.
STEPHEN LIPPIETT.
BENJAMIN LIPPIETT.
WILLIAM LIPPIETT.

Witnesses:
I. W. PHILP,
ALBERT S. PHILLIPS.